Patented Sept. 8, 1942

2,294,925

UNITED STATES PATENT OFFICE 2,294,925

MANUFACTURE OF REACTIVE FORMS OF CELLULOSE AND THE LIKE

Clemmy O. Miller, Milwaukee, Wis., and Arthur E. Siehrs, Chicago, Ill.

No Drawing. Application March 29, 1939, Serial No. 264,858

16 Claims. (Cl. 260—209)

This invention relates to the manufacture of reactive forms of cellulose and the like, and refers more particularly to improved processes of treatment whereby chemical and/or physical changes are produced in the base materials so that their rates of reaction with reagents for producing derivatives therefrom are markedly increased.

A primary object of the invention is to obtain a reactive form of cellulose from which viscose, cellulose esters, and cellulose ethers can be obtained more readily and more conveniently than by the methods that are now being used. The general methods to be presently described for manufacturing reactive forms of cellulose are applicable to carbohydrates of similar constitution, such as starch and other polysaccharides and the invention comprises the treatment of these substances when the application of the improved process is found to be of advantage. It is therefore to be understood that where the term "cellulose" is used it is intended to cover the treatment of similar materials whenever found advantageous.

The activation of cellulose heretofore has been effected by treatment with aqueous solutions of caustic soda to convert it into what is generally called soda cellulose, it being usually necessary to allow the treatment to continue for periods varying from 12 to 72 hours to obtain a sufficiently active alkali cellulose to react readily with carbon disulfide to form viscose compositions utilized in the manufacture of silk substitutes. The ageing of the soda cellulose requires varying periods of time, depending upon such factors as the source of the cellulosic material such as cotton or cotton linters, wood pulp, linen rags, et cetera, and it is obvious that a process whereby the cellulose could be rendered sufficiently reactive so that it will react with carbon disulfide without pretreatment with caustic soda and ageing would be of great value in the manufacture of viscose.

In the manufacture of cellulose acetate, taking it as an example of the manufacture of cellulose esters, cellulose by one process is treated with a mixture of glacial acetic acid and acetic anhydride. During the reaction a part of the acetic anhydride is converted into acetic acid. The discovery of a form of cellulose that will react directly with appropriate substances to give cellulose acetate without degradation of a part of it to some form that will not react with cellulose, would be of great value in the manufacture of cellulose acetate. In the ordinary methods of manufacture of cellulose acetate it is customary to employ a certain amount of sulfuric acid as a means of assisting in the removal of water from the reacting substances. The present process, as will be presently explained, offers a simpler method for the production of cellulose acetate due to the greater reactivity of the cellulose produced. This applies to the manufacture of all the cellulose esters.

The above illustrations will suffice to show that cellulose of greater reactivity than is found in the types produced by caustic soda treatment will find important uses in the cellulose industries.

In its most general and preferred embodiment the present invention comprises the production of reactive cellulose by treatment of cellulosic materials with ammonia alone or in combination with various metals, amides, imides, oxides, hydroxides and salts of metals and organic ammonia derivatives, and ammonium derivatives such as amines, salts of amines and quaternary ammonium salts. The ammonia may be utilized either in liquid or gaseous phase and in the liquid phase may be mixed with certain alcohols, hydrocarbons, ethers, aldehydes, acid amides, ketones, acids, esters, nitrobenzene, et cetera, according to their solubility and in the gaseous phase may be diluted with such gases as nitrogen, hydrogen, etc. The various modifications of treatment comprised within the scope of the invention will be set forth in detail in the following specification.

In one specific embodiment the invention comprises the manufacture of reactive cellulose by treatment of cellulosic materials with anhydrous ammonia. When we wish to refer to an anhydrous ammonia that has been treated to remove the water that is present as an impurity by some special process, we will designate it as dry anhydrous ammonia or dried anhydrous ammonia. We shall refer to the reactive product obtained when cellulose is steeped in anhydrous ammonia or exposed to ammonia gases or vapors, as ammonia cellulose. We refer to it in this way to designate it from other more reactive forms of cellulose that we shall describe later. We do not infer by the term that it is a salt of cellulose or that the nitrogen content of the cellulose is even increased. It is somewhat analogous to the term soda cellulose, which refers to cellulose that has been treated with strong caustic soda. By ammonia cellulose, we mean cellulose that has been brought into contact with anhydrous ammonia, or ammonia gas or vapors. The cellulose used in the preparation of ammonia cellulose is preferably cellulose that has been dried by exposure to the air or subjected to any convenient drying process that decreases its moisture content to some very low value, as 0.3% or less. The moisture content of cellulose dried by exposure to air varies with the humidity of the air. It may be as high as 8% or as low as 0.3%. We shall refer to cellulose that has been dried by exposure to air as air-dry cellulose or air-dried cellulose and to cellulose that has been subjected to any convenient drying process, such that its moisture content is less than 0.3%, as dry cellulose or dried cellulose.

As an example of the method of operation when preparing ammonia cellulose, we cite the following: Ten parts of cellulose, as cotton, cotton linters, wood pulp, et cetera, are placed in a container well insulated from heat, and approximately 50 parts of anhydrous ammonia are drawn onto the cellulose. The ratio of cellulose to anhydrous ammonia may vary, but the cellulose must be covered by the anhydrous ammonia, and all the cellulose must be brought into contact with the anhydrous ammonia. The cellulose may be allowed to steep for, say 15–30 minutes, after which time it is removed from the anhydrous ammonia, treated in some convenient way to free it from any liquid that is adhering to it, as by evaporation, pressing, reduced pressure, heat et cetera, or any combination of these. The ammonia cellulose prepared in this way can be immediately converted (without ageing) into viscose by treatment with carbon disulfide and sodium hydroxide in aqueous solution or into cellulose esters or cellulose ethers by treatment with the appropriate substances. We will set forth the details of these processes later.

In the manufacture of ammonia cellulose, we have found that it is convenient to carry out the steeping of the cellulose at approximately the boiling point of anhydrous ammonia at atmospheric pressure, which is about $-28°$ F. We have found that treatment of cellulose with anhydrous ammonia at higher temperatures up to a maximum of approximately $266°$ F., or at lower temperatures down to a minimum of approximately $-107.2°$ F., or pressures up to approximately 115 atmospheres or down to $\frac{1}{10}$ atmosphere still gives ammonia cellulose. The cellulose used may be dried cellulose or air-dry cellulose as previously defined, and the anhydrous ammonia may be commercial anhydrous ammonia or dried anhydrous ammonia. We have found that we can obtain satisfactory yields of ammonia cellulose when any combination of these is used.

In our illustration, we state that the anhydrous ammonia is drawn onto the cellulose; we have found it equally convenient to prepare ammonia cellulose by introducing the cellulose into the anhydrous ammonia. The exact proportions of cellulose to anhydrous ammonia is not essential, although in general it is desirable to have an excess of ammonia present. We have been able to obtain ammonia cellulose under all conditions where the cellulose comes into contact with the anhydrous ammonia and becomes saturated with it. The time required for steeping depends upon the degree of comminution of the cellulose, but seldom amounts to more than 30 minutes.

While we have obtained ammonia cellulose that is satisfactory in less time than 15 minutes, we believe 15 minutes is the minimum time for steeping. The ammonia cellulose obtained by allowing cellulose to steep in anhydrous ammonia for six hours seems to have few advantages over ammonia cellulose obtained after 30 minutes. By increasing the temperature and correspondingly increasing the pressure to maintain the ammonia as a liquid, the time required for the desired reaction may be shortened.

Furthermore, we have found that the form in which the cellulose exists is not a limiting factor for the production of ammonia cellulose. For example, it may be in a loose powdery form as wood pulp, fine form like cotton linters, it may be a thread or filament, or it may be woven, knitted, or fabricated in any way. The important factor is that it be sufficiently loose to permit penetration by the liquid ammonia and sufficient time be given for its penetration.

We do not know the chemical structure of the cellulosic product that we designate as ammonia cellulose. It may be an ammonium salt of cellulose or it may have a different physical structure which accounts for its increased reactivity. In support of the former explanation, cellulose is an acid in anhydrous ammonia, which would make salt formation a possibility. It is well known to those familiar with the properties of solutions of salts in liquid ammonia, that compounds are ammonolyzed in anhydrous ammonia, though to a less extent than they are hydrolyzed in water. Thus, the fact that the ammonium salt of cellulose cannot exist in water does not prove that the ammonium salt of cellulose cannot exist in anhydrous ammonia.

We wish to point out that the properties of cellulose obtained in the way that we have described are profoundly different from cellulose that has been treated with ammonia water or ammonium hydroxide. It is therefore a new product.

In another specific embodiment the invention comprises preparation of ammonia cellulose by treatment of cellulosic materials with ammonia gas. In operations of this character we prefer to use finely separated air-dry cellulose which has been rendered adsorbent by any convenient process. It is placed in a closed container and ammonia gas or vapor containing preferably less than 5% water vapor is slowly led over it, preferably at superatmospheric pressure. We prefer to cool the container and not to allow the temperature of the material to go above $212°$ F. The time required for this process varies from 1 to 6 hours. Ammonia cellulose obtained in this way may be immediately (without ageing) converted into viscose by treatment with carbon disulfide and caustic soda, or into cellulose esters or cellulose ethers by use of the appropriate chemicals. The details of these methods will be set forth later.

We have found that dried cellulose and dry ammonia gas do not give ammonia cellulose as readily as air-dry cellulose and ammonia gas or vapor containing water vapor, preferably less than 5%. The presence of water in the fiber and in the gas seems to favor the preparation of the ammonia cellulose. Dried cellulose can be used when the ammonia gas or vapor contains water vapor. It is not necessary that there be a stream of gas flowing over the cellulose; it is sufficient to have a continuous quantity of the gas in contact with the cellulose. It will be obvious that cellulose which has been rendered absorbent by any suitable process will take up ammonia faster than the ordinary or less absorbent varieties.

Treatment under pressure with cooling seems to favor the rapid absorption of ammonia by cellulose. When a highly absorbent cellulose is used considerable heat is evolved in the process. An increase in temperature decreases the rate of absorption of ammonia by the cellulose. The length of time required for obtaining a product having a maximum reactivity varies with the degree of absorbency of the cellulose, the moisture content of the cellulose, the water content of the ammonia gas, the pressure of the ammonia gas or vapor, the temperature at which the process is carried out, and the degree of comminution.

The properties of ammonia cellulose prepared in this way are essentially the same as the properties of ammonia cellulose prepared by treatment with anhydrous ammonia. The form of the cellulose includes finely divided cellulose, filaments, threads, woven or knitted or cellulose in any fabricated form.

In a further specific embodiment the invention comprises the production of active cellulose by treatment of cellulosic materials with solutions of alkali metals such as sodium potassium, et cetera, in liquid ammonia.

In the preparation of reactive forms of cellulose by a process of this type, we prefer to use sodium, and to carry it out as follows. We shall refer to the reactive form of cellulose formed in this way as sodium cellulose. We shall discuss later the relation of the sodium to the cellulose. By sodium cellulose we mean a cellulose product obtained by treating dry cellulose suspended in dried anhydrous ammonia with any amount of sodium up to such amount that if any more sodium is added, the anhydrous ammonia will remain blue. Twenty-five parts of dried cellulose, having a moisture content of 0.3% or less, may be placed in a container well insulated from heat. The container must be constructed in such a way that air cannot enter the system, but any gas formed may escape. One hundred twenty-five parts of dried anhydrous ammonia may be drawn onto the cellulose. One part of sodium is dropped into the anhydrous ammonia in small pieces in such a way that the exposure of the sodium to air is minimized and no air is permitted to enter the container.

When sodium dissolves in anhydrous ammonia, a deep blue color is formed in the solution. When cellulose is present, the color is fleeting, for the cellulose reacts with the dissolved metal to give hydrogen and a colorless solution. The cellulose is not visibly dissolved in the process. The amount of hydrogen liberated under the conditions described is chemically equivalent to the amount of sodium added. We prefer to stir while adding the sodium. Two hours are generally required for this treatment. The time varies with the degree of comminution of the cellulose; the more finely divided the product, the shorter is the time required for treatment. The reaction is complete when the blue color is discharged following the addition of all of the sodium. The cellulose product is separated from the anhydrous ammonia by any convenient process, as evaporation, pressing, exposing to a reduced pressure, warming slightly, or any combination of these. The cellulosic product is then ready for conversion into viscose by treatment with carbon disulfide and caustic soda, or into cellulose esters and cellulose ethers by methods that will be described subsequently.

We have found that it is of great importance to have the cellulose thoroughly dried, i. e., a moisture content of 0.3% or less, to have the anhydrous ammonia thoroughly dried, and the apparatus built in such a way that the cellulose, anhydrous ammonia or its vapors in the container, the sodium and the cellulosic product formed is minimally exposed to the moisture of the air. When the sodium is added, if water is present, it will react first with the water to form sodium hydroxide which is insoluble in anhydrous ammonia. After the water is used up the sodium will react with the cellulose. When a graph is prepared showing the rate of liberation of hydrogen with respect to moisture content of cellulose, it shows a sharp break where the moisture content of cellulose becomes 0.3% or less. Obviously, the use of incompletely dried cellulose and incompletely dried anhydrous ammonia in this process is not economical.

We have found that it is most convenient to carry out the process at the temperature of boiling ammonia at atmospheric pressure, which is about $-28°$ F. However, we have found that the properties of the cellulosic product obtained at higher temperatures, as 266° F., or lower temperatures, $-107.2°$ F., or at higher pressures, as high as 115 atmospheres, or at lower pressures, as $\frac{1}{10}$ atmosphere, do not differ essentially from that prepared at $-28°$ F.

In our illustration, we have used the proportions of 25 parts of cellulose to one part of sodium. We have tried other proportions of cellulose and sodium, as 4 parts of cellulose to 1 part of sodium, and 10 parts of cellulose to 1 part of sodium. The reactivity of the sodium cellulose increases with increasing sodium content and decreases with decreasing sodium content. The proportions of cellulose to sodium should not be such that the deep blue color of the solution is not discharged by the cellulose. For the preparation of viscose, sodium cellulose prepared by treating 25 parts of cellulose with 1 part of sodium gives a satisfactory viscose. For the preparation of cellulose esters, the proportions of about 4 to 1 seem to be best. In the preparation of sodium cellulose having a very low sodium content, it is important that no water be present in any form, for very little water is required to transform the small amount of sodium into sodium hydroxide. A mixture of cellulose and sodium hydroxide would be obtained and not sodium cellulose, as we define it.

In the treatment of cellulose with sodium in anhydrous ammonia, the cellulose should be covered by the anhydrous ammonia to insure all the cellulose coming into contact with the sodium. The order in which cellulose, anhydrous ammonia, and sodium are brought together is of little consequence. For example, the sodium may be added to the anhydrous ammonia first and the cellulose last. The form in which the cellulose is treated is of little consequence. It may be finely divided, or in the form of filaments or threads, knitted, woven, or otherwise fabricated into special forms.

We do not know what takes place in the cellulose when it is changed into sodium cellulose. The transformation may be chemical and/or physical. Since cellulose is a weak acid in anhydrous ammonia, it is possible that sodium cellulose is a sodium salt of cellulose. We have some evidence that supports this explanation. Since it is known that salts are ammonolyzed in anhydrous ammonia though usually to a less degree than they are hydrolyzed in water, there is a possibility of its existence in anhydrous ammonia. Sodium cellulose is profoundly different from the soda cellulose or alkali cellulose prepared by treating cellulose with a strong aqueous solution of sodium hydroxide such as 20%. Ordinary soda cellulose contains a large amount of sodium hydroxide solution that is not pressed out in its manufacture, this frequently constituting a disadvantage when used as a base for the manufacture of cellulose derivatives.

We have set forth in detail the method we prefer to use in the preparation of sodium cellulose. Potassium cellulose, or other metal celluloses, or a mixture of any metal celluloses, may be prepared similarly by using any appropriate metal, or metals, provided that the metal is sufficiently soluble in anhydrous ammonia.

In a further specific embodiment the invention comprises the production of active cellulose by treatment of cellulose materials with ammonia and metal amides, imides or nitrides individually or in suitable combinations. As example of compounds included in this class may be mentioned sodamide, potassium amide and the other amides of the alkali metals and such substances as barium imide, magnesium nitride, et cetera.

In conducting operations of this character we prefer for certain reasons to use potassium amide as follows: Three parts of dried cellulose is suspended in ten parts of dry anhydrous ammonia, and one part of potassium amide is added. It is allowed to stand for an hour, after which the cellulose may be separated from the adhering liquid by pressing, allowing time for evaporation, exposure to reduced pressure, or slight warming. It is then ready for conversion into cellulose products.

As in the case of the preparation of sodium cellulose, moisture is an important factor and must be excluded from the materials used and the containing vessel. The container must be constructed to prevent the entrance of air carrying moisture. Even though a reactive product may be obtained using cellulose that has been incompletely dried or wet ammonia, it is generally not economical to carry it out in this way. The success of the reaction is not dependent upon any particular temperatures and pressures, and therefore the choice of temperature and pressure is made on the basis of convenience. We have found the temperature of boiling ammonia at atmospheric pressure to be the most convenient. When we use sodamide, we have found it more convenient to carry out the process at 25° C. and at the pressure of anhydrous ammonia at that temperature. The ratio of amounts of potassium amide to cellulose used may vary considerably and still give a reactive material. We have not found it advantageous to increase the amount of potassium amide beyond the point where the ratio of amounts of potassium amide to cellulose is greater than 1.

In a further specific embodiment the invention comprises the production of active cellulose by the treatment of cellulosic materials with liquid ammonia containing ammonium salts such as ammonium chloride, ammonium sulfate, ammonium carbonate, ammonium phosphate, ammonium sulfocyanate, etc. In place of the ammonium salts the amides of organic acids such as acetamide may be employed and also urea or its derivatives.

In applying this modification of the process of the invention to practice we may proceed as follows: Ten parts of air-dry cellulose is placed in a suitable container and 50 parts of commercial anhydrous ammonia is drawn onto it. Ten parts of ammonium chloride is added to the cellulose and anhydrous ammonia. It is allowed to stand for six hours. The cellulose is removed by any convenient process and is freed from any adhering liquid by being subjected to pressing, evaporation, exposure to reduced pressure, slight warming, or any combination of these. It is then ready for use. We have not found moisture to interfere materially in the successful preparation of this reactive form. The process is carried out most conveniently at the boiling point of anhydrous ammonia at atmospheric pressure, which is about −28° F. The order of combination of the materials may be changed without serious consequence, as for example, the ammonium chloride may be added to the anhydrous ammonia and the cellulose added last. The length of time allowed for steeping may vary and still give a reactive product. The ammonia may be allowed to evaporate spontaneously instead of being separated from the ammonia mechanically. The cellulose may be in a finely divided state, or as filaments, threads, or fabricated into a cloth. The method used in treating cellulose with other ammonium salts or with the organic amides and ureides is essentially the same as for ammonium chloride.

In a further specific embodiment the invention comprises the treatment of cellulosic materials for the production of active cellulose with liquid ammonia, organic amines and/or substituted ammonium salts. For example, primary, secondary or tertiary aliphatic amines may be used provided they can be dissolved in anhydrous, liquid ammonia such as ethylamine, dimethylamine, tripropylamine, ethylene diamine, respectively, or the salts and hydroxides or compounds such as tetraethyl ammonium chloride, or tetraethyl ammonium hydroxide.

In the case of triethyl amine the preparation of active cellulose is readily carried out by adding one part of triethyl amine to four parts of dry cellulose in fifty parts of dried anhydrous ammonia at −28° F. It is not necessary that the cellulose and ammonia be dried. We have found it most convenient to carry out the preparation at −28° F.; however, other combinations of temperature and pressure give satisfactory results. The time required is less than two hours. The cellulosic product may be recovered by any convenient process, by evaporation, pressing, exposure to reduced pressure, slight warming, or any combination of these.

In a further specific embodiment the invention comprises the production of active cellulose by the treatment of cellulosic materials with ammonia and metal oxides such as, for example, cupric oxide, silver oxide, etc. In the case of metals of the alkaline earth group, their hydroxides may be employed with proper adjustment of the treating conditions.

In illustrating the method of preparation of active cellulose according to this method, we shall cite a case in which cupric oxide is used. To 4 parts of dried cellulose is added 50 parts of dried anhydrous ammonia and 1 part of cupric oxide. The mixture is allowed to stand for about six hours, after which time the cellulose is separated from the anhydrous ammonia and the excess cupric oxide by any convenient process, such as, filtration and pressing; or the ammonia may be allowed to evaporate off, leaving the excess copper oxide with the cellulose.

We have found it satisfactory to use air-dry cellulose and commercial anhydrous ammonia, although we prefer to use dried cellulose and dried anhydrous ammonia. As in previous cases, we have found it most convenient to carry out the process at the boiling point of ammonia at atmospheric pressure, which is −28° F., although the temperature and pressure can be altered widely without affecting the reaction.

It is possible to vary the amount of cupric oxide used for a given amount of cellulose, and still obtain a reactive form of cellulose. The length of time required for steeping the cellulose depends upon the substance or substances used with the anhydrous ammonia and the degree of comminution of the cellulose. The method for converting cellulose into a more reactive form by using oxides other than cupric oxide and by hydroxides, is essentially the same as that given for cupric oxide.

The modifications of the process using liquid ammonia thus far described may be employed when the liquid ammonia is substantially pure except for small amounts of water or when the ammonia is mixed with or in solution with various other solvents, for instance, with alcohols, hydrocarbons, ethers, aldehydes, ketones, acids, esters, acid amides, nitrobenzene, et cetera. The use of these additional materials is optional and contingent upon a number of factors and depends in general upon whether improved results are obtained by their use. The order in which the cellulose, anhydrous ammonia, inorganic materials and derivatives of ammonia, and the organic materials are combined, may be varied since the successful preparation of the reactive forms is not dependent upon any one order of combination. We are not certain as to whether the properties of the reactive forms of cellulose prepared in the presence of the organic substances is identical with the ones that are prepared in their absence, or not, but have noted that activated forms of cellulose may be advantageously prepared in this way.

In the treatment of cellulose with ammonia gas or ammonia gas and water vapor to form a more reactive form, we have found that gases or vapors, as nitrogen, hydrogen, hydrocarbons, ethers, amines, et cetera, may be incorporated with the ammonia or the ammonia and water vapor without substantially inhibiting the formation of reactive forms. We do not know whether the reactive forms of cellulose prepared in the presence of such vapors are identical with the reactive forms of cellulose prepared with ammonia gas alone, or ammonia and water vapor, but have noted that they possess increased activity and that in some instances benefits are derived by the addition of neutral or diluent gases.

We have set forth various methods for the converting of cellulose into forms that are more reactive towards various chemicals, as carbon disulfide and caustic soda; and acids, acid anhydrides, acid halides, salts of acids, and mixtures of any of these. Our investigations on starch, regenerated cellulose by viscose process, and other polysaccharides have revealed that they may be likewise converted into more reactive forms by treatment with anhydrous ammonia under the conditions described for cellulose. We have found that the properties and uses of these more reactive forms are comparable to the properties and uses of the more reactive forms of cellulose.

We have stated previously that these reactive forms of cellulose can be used in the manufacture of viscose and cellulose esters. We shall cite examples illustrating how cellulose can be converted into viscose and cellulose esters, using the reactive forms that we have described as intermediate products.

Two parts of cellulose was placed in a suitable container, and fifty parts of anhydrous ammonia was drawn onto it. After letting the mixture stand at about −28° F. for 15 minutes, the ammonia cellulose was removed from the anhydrous ammonia, pressed, and finally subjected to a reduced pressure of about one pound per square inch. It was then mixed with one part of carbon disulfide and agitated for two hours. A sufficient amount of 8% sodium hydroxide solution was added, with thorough mixing, to make the cellulose content of the solution 7%. Approximately 28 parts was required. The remainder of the treatment was essentially the same as is now being used commercially. The viscose solution was allowed to stand at 64° F. for 24 hours. After the excess carbon disulfide was removed by blowing air through it, it was filtered, and set aside to mature at 64° F. The maturing process was followed by occasional determinations of the salt number and viscosity.

While we prefer to use air-dry cellulose and anhydrous ammonia, we have found that dried cellulose and dried anhydrous ammonia will also give satisfactory results. We have found that it is important to have the cellulose free from excess ammonia, since its presence leads to unnecessary decomposition of the carbon disulfide. The cellulose content of the viscose solution is determined by the use to which the viscose will be put and can be varied by using different volumes of 8% sodium hydroxide solution. It is possible to use other strengths of sodium hydroxide solution, but we prefer to use the 8% solution. We have observed that the viscose prepared by our method matures faster, that is, the salt number and viscosity of the viscose changes to the salt number and viscosity required for spinning or formation into a film faster than does viscose prepared by the methods now in use.

Sodium cellulose may be made and converted into viscose in the following way: Seven parts of dried cellulose was placed in a container well insulated from heat, and fifty parts of dried anhydrous ammonia was drawn onto it. One part of sodium was added in several portions, and the reaction mixture was allowed to stand for two hours after the addition of the last portion of sodium. The sodium cellulose was removed from the anhydrous ammonia, pressed, and exposed to a reduced pressure of one pound per square inch. It was then thoroughly agitated with 3½ parts of carbon disulfide for two hours, after which 28 parts of 8% water solution of sodium hydroxide was added, with thorough mixing. This gives a viscose solution having a cellulose content of about 7%. The viscose is allowed to stand at 64° F. for 24 hours. It is filtered in any convenient way, and air is blown through it to remove the excess carbon disulfide. It is then ready to be set for maturing.

Although air-dry cellulose and commercial anhydrous ammonia can be used, we prefer to use dried cellulose and dried anhydrous ammonia, for it is more economical with respect to the sodium. The excess of ammonia should be removed since it decomposes some of the carbon disulfide. As in the case of viscose prepared from ammonia cellulose, the cellulose content can be made of the strength desired by using the proper amount of 8% sodium hydroxide. The strength of the sodium hydroxide can be varied from 1-16%.

We shall cite the preparation of cellulose acetate as an example of the use of our reactive forms of cellulose in the preparation of cellulose esters. For the preparation of the sodium cellulose for use in the formation of cellulose acetates, we prefer to treat 4 parts of dried cellulose in 50 parts of dried ammonia with 1 part of sodium. To one part of this sodium cellulose is added about 40 parts of acetone and 30 parts of acetyl chloride. The reaction mixture is warmed to 122° F. for one hour and then allowed to cool to room temperature. It is allowed to stand for three hours. The reaction mixture is passed through a filter.

We have found also that the reaction can be carried out in a mixture of acetone in water, the proportions being approximately 75 parts of acetone to 25 parts of water. Also, benzene and benzene and water, in which the mixture of the benzene and water is in the proportion of approximately 75 parts of benzene to 25 parts of water, can be used. The product obtained by this medium is essentially the same as the product obtained when acetone is used as the reaction medium. The cellulose acetate is precipitated by the addition of water or ether. It is soluble in chloroform and acetone.

While we have specified the manufacture of cellulose acetates from sodium cellulose, we may form cellulose acetates by reaction with ammonia cellulose. We include cellulose nitrate as one of the cellulose esters that can be prepared in this way.

While air-dry cellulose and commercial anhydrous ammonia can be used, we prefer to use the dried materials because the sodium is used more economically on account of none being needed to react with water. Varying amounts of sodium can be used, up to the proportions of 2 parts of cellulose to 1 part of sodium. The acetate content of the cellulose acetate produced varies with the sodium content of the sodium cellulose. We have cited a preparation in which we used acetyl chloride, however, under appropriate conditions acids, acid anhydrides, acid halides, metallic salts of these acids or mixtures of these may be used. Both inorganic and organic esters can be prepared by this method. Other esters of cellulose may be prepared essentially as described for cellulose acetate.

While we have specified definite proportions in the various examples given, it is to be understood that these proportions may be varied widely within the contemplation of this invention and without departing from the scope thereof by those skilled in this art. We do not desire to limit ourselves in any way to the exact proportions specified, as they are merely illustrative of conditions with which we have had success and are not to be construed as limiting factors.

This is a continuation in part of our co-pending application Serial No. 589,974, filed January 30, 1932.

We claim:

1. In the preparation of reactive carbohydrates, the improvement which comprises treating a carbohydrate with an aliphatic amine dissolved in liquid, anhydrous ammonia.

2. In the preparation of reactive carbohydrates, the improvement which comprises treating a carbohydrate with a primary aliphatic amine dissolved in anhydrous, liquid ammonia.

3. In the preparation of reactive carbohydrates, the improvement which comprises treating a carbohydrate with a secondary aliphatic amine dissolved in liquid, anhydrous ammonia.

4. In the preparation of reactive carbohydrates, the improvement which comprises treating a carbohydrate with a tertiary aliphatic amine dissolved in anhydrous, liquid ammonia.

5. In the preparation of reactive cellulosic materials, the improvement which comprises treating a cellulosic material with an aliphatic amine dissolved in liquid, anhydrous ammonia.

6. In the preparation of reactive cellulosic materials, the improvement which comprises treating a cellulosic material with a primary aliphatic amine dissolved in anhydrous, liquid ammonia.

7. In the preparation of reactive cellulosic materials, the improvement which comprises treating a cellulosic material with a secondary aliphatic amine dissolved in liquid, anhydrous ammonia.

8. In the preparation of reactive cellulosic materials, the improvement which comprises treating a cellulosic material with a tertiary aliphatic amine dissolved in anhydrous, liquid ammonia.

9. In the preparation of reactive carbohydrates, the improvement which comprises treating a carbohydrate at a temperature of about −28° F. with an aliphatic amine dissolved in liquid, anhydrous ammonia.

10. In the preparation of reactive carbohydrates, the improvement which comprises treating a carbohydrate at a temperature of about −28° F. with a primary aliphatic amine dissolved in liquid, anhydrous ammonia.

11. In the preparation of reactive carbohydrates, the improvement which comprises treating a carbohydrate at a temperature of about −28° F. with a secondary aliphatic amine dissolved in liquid, anhydrous ammonia.

12. In the preparation of reactive carbohydrates, the improvement which comprises treating a carbohydrate at a temperature of about −28° F. with a tertiary aliphatic amine dissolved in anhydrous, liquid ammonia.

13. In the preparation of reactive cellulosic materials, the improvement which comprises treating a cellulosic material at a temperature of about −28° F. with an aliphatic amine dissolved in liquid, anhydrous ammonia.

14. In the preparation of reactive cellulosic materials, the improvement which comprises treating a cellulosic material at a temperature of about −28° F. with a primary aliphatic amine dissolved in liquid, anhydrous ammonia.

15. In the preparation of reactive cellulosic materials, the improvement which comprises treating a cellulosic material at a temperature of about −28° F. with a secondary aliphatic amine dissolved in liquid, anhydrous ammonia.

16. In the preparation of reactive cellulosic materials, the improvement which comprises treating a cellulosic material at a temperature of about −28° F. with a tertiary aliphatic amine dissolved in liquid, anhydrous ammonia.

CLEMMY O. MILLER.
ARTHUR E. SIEHRS.